United States Patent [19]

Meininger et al.

[11] 3,966,704
[45] June 29, 1976

[54] NAPHTHYLAZO NAPHTHYL COPPER COMPLEX DYESTUFFS

[75] Inventors: Fritz Meininger, Frankfurt am Main; Klaus Hunger, Kelkheim, Taunus; Hartmut Springer, Frankfurt am Main, all of Germany

[73] Assignee: Hoechst Aktiengesellschaft, Frankfurt am Main, Germany

[22] Filed: Oct. 26, 1973

[21] Appl. No.: 409,813

Related U.S. Application Data

[63] Continuation of Ser. No. 122,243, March 8, 1971, abandoned.

[30] Foreign Application Priority Data

Mar. 6, 1970 Germany.............................. 2010656

[52] U.S. Cl............................. 260/150; 260/146 D; 260/147; 260/149; 260/154; 260/162; 260/163; 260/193; 260/194

[51] Int. Cl.² .................. C09B 45/18; C09B 45/32; D06P 3/60

[58] Field of Search................ 260/146 R, 147, 149, 260/150, 151

[56] References Cited

UNITED STATES PATENTS

| | | | |
|---|---|---|---|
| 2,670,265 | 2/1954 | Heyna et al...................... | 260/158 X |
| 3,114,745 | 12/1963 | Lodge et al....................... | 260/147 |
| 3,135,730 | 6/1964 | Heyna et al...................... | 260/147 |
| 3,234,205 | 2/1966 | Kühne et al. ..................... | 260/151 |
| 3,419,542 | 12/1968 | Meininger et al................. | 260/195 |
| 3,426,008 | 2/1969 | Meininger et al................. | 260/151 |
| 3,440,420 | 4/1969 | Kühne et al. ..................... | 260/187 |

FOREIGN PATENTS OR APPLICATIONS

1,444,279  10/1969  Germany........................ 260/146 T

*Primary Examiner*—Floyd D. Higel
*Attorney, Agent, or Firm*—Curtis, Morris & Safford

[57] ABSTRACT

New valuable metal complex compounds, preferably copper, nickel, chromium or cobalt complex compounds, of monoazo dyestuffs which in the metal-free form and in form of the free acid correspond to the general formula (1)

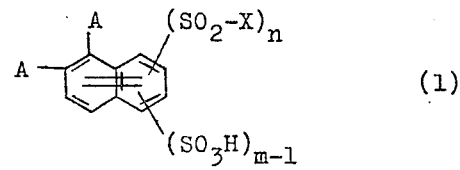

(1)

in which one A stands for the group of the formula (2)

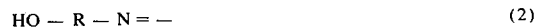

(2)

wherein HO—R— represents the radical of a coupling component of the series of the acetoacetic acid arylamide, barbituric acid, pyrazolone or of naphthalene, the hydroxyl group of which is in a vicinal position with regard to the azo group, and the other A stands for a hydroxyl group, X for a vinyl group or for a group having the formula —CH₂—CH₂—Z, wherein Z represents the hydroxyl group or an organic or inorganic radical capable of being split off by an alkaline agent, $n$ represents the number 1 or 2 and $m$ a number of from 1 to 3, and processes to prepare them, said dyestuffs being suitable for the dyeing and printing of different materials, such as wool, silk, poly amide fiber materials or leather, especially of cellulose-containing materials such as cotton, regenerated cellulose and linen, yielding intense dyeings and prints of high tinctorial strength which exhibit good to very good fastnesses to light, wet processing, washing, perspiration, steaming, ironing and rubbing and are resistant to chemical solvents.

1 Claim, No Drawings

NAPHTHYLAZO NAPHTHYL COPPER COMPLEX DYESTUFFS

This application is a continuation application of pending application Ser. No. 122,243 filed Mar. 8, 1971, and now abandoned.

The present invention relates to new, valuable metal complex compounds, preferably copper, nickel, chromium or cobalt complex compounds, of monoazo dyestuffs which in the metal-free form and in form of the free acid correspond to the general formula (1)

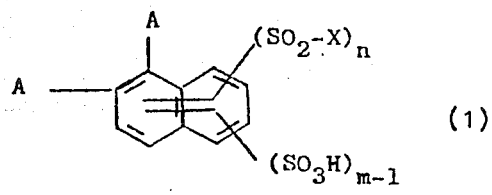

in which one A stands for the group of the formula (2)

$$HO - R - N = N - \qquad (2)$$

wherein HO—R— represents the radical of a coupling component of the series of the acetoacetic acid arylamide, barbituric acid, pyrazolone or of naphthalene, the hydroxyl group of which is in a vicinal position with regard to the azo group, and the other A stands for a hydroxyl group, X for a vinyl group or for a group having the formula —$CH_2$—$CH_2$—Z, wherein Z represents the hydroxyl group or an organic or inorganic radical capable of being split off by an alkaline agent, $n$ represents the number 1 or 2 and $m$ a number of from 1 to 3. The present invention also provides processes for the preparation of the said dyestuffs.

As examples for the radical R of a coupling component of the acetoacetic acid arylamide, barbituric acid, pyrazolone or naphthalene series, there may be mentioned:

The radical of an acetoacetic acid anilide, which carries further substituents in the phenyl nucleus, such as halogen atoms, methyl, methoxy or sulfonic acid groups or groups having the formula —$SO_2$—X, wherein X has the abovementioned meanings; furthermore the radical of the barbituric acid; a pyrazole radical, which carries the hydroxyl group in 5-position and the azo group in 4-position and which may contain a further substituent in 3 position, as for example a methyl group, a carboxyl group, a carboxylic acid ester group or carboxylic acid amide group and in 1-position a further substituent, such as a phenyl group, which may be substituted for example by chlorine atoms, methyl groups, sulfonic acid groups or groups of the formula —$SO_2$—X, wherein X has the above meanings; moreover especially a naphtylene radical, which may contain further substituents, such as methyl, methoxy, amino, acylamino, hydroxy and particularly sulfonic acid groups or groups of the formula —$SO_2$—X, wherein X has the above meanings.

As examples for the substituent Z which may be split off by an alkaline agent there may be cited a halogen atom, such as a chlorine or bromine atom, an alkyl or aryl sulfonic acid radical, such as the methylsulfonyloxy or p-toluenesulfonyloxy radical, an acyloxy group, such as the acetoxy group or the 3-sulfobenzoyloxy group, furthermore the phenoxy group, a dialkylamino group, as for example the dimethylamino and diethylamino group, the thiosulfuric acid radical, the phosphoric acid radical and especially the sulfuric acid radical.

The new metal complex compounds of monoazo dyestuffs are 1:1 or 1:2 metal complexes, depending on whether the metal atom is complex-bound to one dyestuff radical (as in the case of copper, nickel or chrome) or to two dyestuff radicals (as in the case of cobalt or chrome).

The new metal complex compounds of monoazo dyestuffs of the mentioned general formula (1) may be prepared by treating monoazo dystuffs of the mentioned general formula (3)

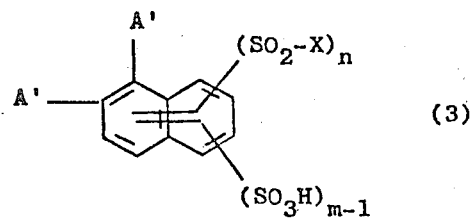

in which one A' stands for the group of the formula (2), wherein R has the above meanings, and the other A' represents a hydrogen or chlorine atom or, as a group forming a metal complex, a hydroxyl or lower alkoxy group and X, $m$ and $n$ have the above meanings, according to usual methods with agents yielding metal.

Such methods are described for example in Houben-Weyl, Methoden der organischen Chemie, 4th ed., vol. 10/3, p. 434 et seq. (1965): The metallization of o,o'-dihydroxy-azo dyestuffs, the dealkylating metallization of o-hydroxy-o'-alkoxy-azo dyestuffs, the metallization under separation of a halogen atom which is in a o-position with regard to the azo group, and especially the oxidative coppering which is particularly important for the preparation of copper complexes of azo dyestuffs of the formula (1).

For example, in the process of oxidative coppering, the azo dyestuffs of the formula (3), in which one A' stands for a hydrogen atom and the other A' for a group of the formula (2) wherein R has the above meanings, and in which X, $m$ and $n$ are specified as above, are converted into copper complex dyestuffs, preferably in a slightly acidic medium in the presence of at least the equivalent amount of copper salts, such as copper (II) sulfate, copper (II)-chloride or copper (II)-acetate by means of oxidizing agents, such as hydrogen peroxide or sodium perborate, at temperatures of from about 0°C to about 100°C, preferably at 20° – 70°C.

The so-obtained copper complex dyestuffs may be converted in usual manner into complex dyestuffs containing another metal, for example into monoazo dyestuffs containing cobalt or chrome, by decoppering them in known manner, for example with a strong mineral acid or with alkali sulfides and by treating the obtained o,o'-dihydroxy- azo dyestuffs according to known methods with corresponding agents yielding metal.

Metal complexes of azo dyestuffs of the formula (1), in which X stands for the grouping —$CH_2$—$CH_2$—OH, may be subsequently converted in known manner into metal complexes of azo dyestuffs of the formula (1), in which X stands for the grouping —CH=CH₂ or CH₂—CH₂—Z, wherein Z represents an organic or inorganic radical capable of being split off by an alkaline agent.

For example, metal complexes of azo dyestuffs of the formula (1) in which X stands for the grouping —CH₂—CH₂—OSO₃H, may be obtained from metal complexes of azo dyestuffs of the formula (1), in which X stands for the grouping —CH₂—CH₂—OH, by treating with amido sulfonic acid or chlorosulfonic acid in pyridine or homologous bases. Sulfating may also be carried out in concentrated sulfuric acid or in a 100% sulfuric acid. Using this method, however, the metal complex is demetallized and then it must be formed back by appropriate operations, for example by increasing the pH-value to 3 – 7.

Metal complexes of azo dyestuffs of the formula (1) in which X stands for the group —CH=CH₂, may be prepared in known manner from metal complexes of azo dyestuffs of the formula (1), in which X stands for the group —CH₂—CH₂—Z, wherein Z represents an organic or inorganic radical capable of being split off by an alkaline agent, by treating with alkalies, such as sodium carbonate or sodium hydroxide.

Metal complexes of azo dyestuffs of the formula (1) in which Z stands for the thiosulfuric acid radical or for a dialkylamino group, may be prepared in known manner from metal complexes of dyestuffs of the formula (1), in which X stands for the vinyl group, by reaction with salts of the thiosulfuric acid, such as sodium thiosulfate, or by reaction with dialkylamines, such as diethylamine.

The azo dyestuffs of the formula (3) serving as starting compounds for preparing the new metal-containing monoazodyestuffs may be obtained according to processes for preparing azo dyestuffs which were described for example in the Belgian patent specification Nos. 737,198, 737,940, 738,101 and 738,292.

The new metal-containing monoazo dyestuffs obtained according to the described processes are very suitable for the dyeing and printing of different materials, such as wool, silk, polyamide fibre materials or leather, especially of cellulose-containing materials such as cotton, regenerated cellulose and linen. They may be preferably employed according to the dyeing and printing processes generally used for reactive dyestuffs on the industrial scale, and they yield, for example on cellulose fibre materials in the presence of alkaline agents, intense dyeings and prints of high tinctorial strength which exhibit good to very good fastnesses to light, wet processing, washing, perspiration, steaming, ironing and rubbing and are resistent to chemical solvents.

The new metal complex dyestuffs obtained according to the present process are superior to the next comparable dyestuffs known from German patent specification No. 1,126,542, as concerns colour build-up according to dyeing and printing processes.

The following Examples serve to illustrate the invention. Parts and percentages are by weight, unless stated otherwise.

EXAMPLE 1:

78.4 Parts (0.1 mole) of the dyestuff of the formula

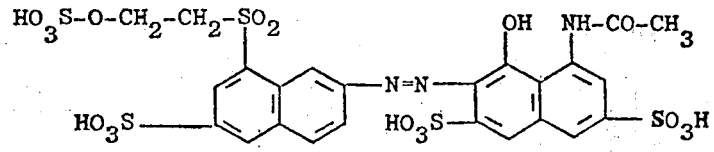

were dissolved at 50°C in 600 parts of water. A solution of 27.5 parts of crystallized copper (II)-sulfate in 200 parts of water and a solution of 41 parts of crystallized sodium acetate in 200 parts of water were added, and for about one hour, 68 parts of a 10% hydrogen peroxide were added dropwise at 50°C.

When the oxidizing coppering was finished, the formed copper complex dyestuff which in form of the free acid corresponds to the formula

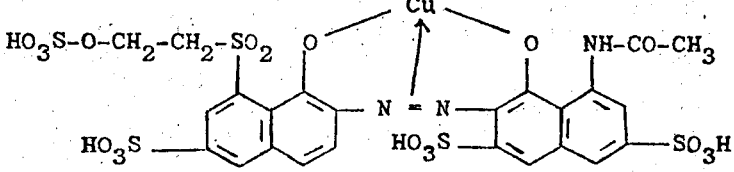

was salted out with potassium chloride, filtered off and dried. 85 Parts of a salt containing dyestuff were obtained which dyed cotton fabrics in the presence of alkaline agents in navy blue shades of a good fastness to washing and a very good fastness to light.

If, instead of the azo dyestuff used in this Example, there are used azo dyestuffs which have been prepared from the diazo and coupling components listed in the following Table, dyestuffs with similar good dyeing properties and shades indicated in the Table are obtained.

| Example No. | Diazo component | Coupling component | Shade of the copper complex |
|---|---|---|---|
| 2 | 1-amino-4-(β-sulfatoethylsulfonyl)-naphthalene | 1-hydroxynaphthalene-3-sulfonic acid | violet |
| 3 | '' | 1-hydroxynaphthalene-4-sulfonic acid | bluish violet |
| 4 | '' | 1-hydroxynaphthalene-5-sulfonic acid | reddish blue |

-continued

| Example No. | Diazo component | Coupling component | Shade of the copper complex |
|---|---|---|---|
| 5 | " | 1-(4'-sulfophenyl)-3-carboxy-5-pyrazolone | red brown |
| 6 | " | 1-amino-8-hydroxynapthalene-2,4-disulfonic acid | navy blue |
| 7 | 1-amino-5-(β-sulfatoethylsulfonyl)-naphthalene | 1-hydroxynaphthalene-3,6-disulfonic acid | violet |
| 8 | 1-amino-5-(β-sulfatoethylsulfonyl)-naphthalene-7-sulfonic acid | " | violet |
| 9 | 1-amino-6-(β-sulfatoethylsulfonyl)-naphthalene | 2-hydroxynaphthalene-3,6-disulfonic acid | violet |
| 10 | 1-amino-6-(β-sulfatoethylsulfonyl)-naphthalene-4-sulfonic acid | 1-hydroxynaphthalene-4-sulfonic acid | violet |
| 11 | " | 2-acetylamino-5-hydroxynaphthalene 7-sulfonic acid | violet |
| 12 | 1-amino-7-(β-sulfatoethylsulfonyl)-naphthalene | 1-hydroxynaphthalene-5-sulfonic acid | reddish blue |
| 13 | 1-amino-7-(β-sulfatoethylsulfonyl)-naphthalene-4-sulfonic acid | " | reddish blue |
| 14 | 2-amino-5-(β-sulfatoethylsulfonyl)-naphthalene | 1-acetylamino-8-hydroxynaphthalene 3,6-disulfonic acid | bluish violet |
| 15 | " | 2-hydroxynaphthalene-6,8-disulfonic acid | violet |
| 16 | " | 2-hydroxynaphthalene-3,6,8-trisulfonic acid | violet |
| 17 | 2-amino-6-(β-sulfatoethylsulfonyl)-naphthalene | 1-acetylamino-8-hydroxynaphthalene 3,6-disulfonic acid | bluish violet |
| 18 | 2-amino-8-(β-sulfatoethylsulfonyl)-naphthalene | " | reddish blue |
| 19 | 2-amino-8-(β-sulfatoethylsulfonyl)-naphthalene-6-sulfonic acid | 1-hydroxynaphthalene-4-sulfonic acid | violet |
| 20 | " | 2-hydroxynaphthalene-3,6-disulfonic acid | violet |
| 21 | " | 1-hydroxynaphthalene-4,8-disulfonic acid | bluish violet |
| 22 | " | 1-benzoylamino-8-hydroxynaphthalene 4,6-disulfonic acid | reddish blue |
| 23 | " | 1-benzoylamino-8-hydroxynaphthalene 3,6-disulfonic acid | reddish blue |
| 24 | " | 1-amino-8-hydroxynaphthalene-2,4-disulfonic acid | Blue |
| 25 | " | 1-hydroxynaphthalene-3,7-disulfonic acid | Violet |
| 26 | " | 1-hydroxynaphthalene-3,8-disulfonic acid | bluish Violet |
| 27 | " | 1-hydroxynaphthalene-4,6-disulfonic acid | Violet |
| 28 | " | 1-hydroxynaphthalene-4,7-disulfonic acid | bluish Violet |
| 29 | " | 2-hydroxynaphthalene-5-sulfonic acid | Violet |
| 30 | " | 2-hydroxynaphthalene-6-sulfonic acid | Violet |
| 31 | " | 2-hydroxynaphthalene-7-sulfonic acid | Violet |
| 32 | " | 2-hydroxynaphthalene-8-sulfonic acid | Violet |
| 33 | " | 2-hydroxynaphthalene-5,7-disulfonic acid | Violet |
| 34 | 2-amino-5-(β-sulfatoethylsulfonyl)-naphthalene-1,7-disulfonic acid | 1-hydroxynaphthalene-5-sulfonic acid | Violet |
| 35 | 3-amino-1,5-bis-(β-sulfatoethylsulfonyl)-naphthalene | 1-acetylamino-8-hydroxynaphthalene 3,6-disulfonic acid | bluish Violet |
| 36 | " | 1-acetylamino-8-hydroxynaphthalene 4,6-disulfonic acid | bluish Violet |
| 37 | " | 1-benzoylamino-8-hydroxynaphthalene-3,6-disulfonic acid | reddish blue |
| 38 | " | 2-acetylamino-8-hydroxynaphthalene-6-sulfonic acid | red violet |
| 39 | " | 2-acetylamino-8-hydroxynaphthalene-3,6-disulfonic acid | violet |
| 40 | " | 1-acetylamino-5-hydroxynaphthalene-7-sulfonic acid | violet |
| 41 | " | 1-hydroxynaphthalene-4-sulfonic acid | red violet |
| 42 | " | 2-hydroxynaphthalene-3,6-disulfonic acid | red violet |
| 43 | " | 1-(4'-Sulfophenyl)-3-carboxy-5-pyrazolone | red brown |
| 44 | 2-amino-6,8-bis-(β-sulfatoethylsulfonyl)-naphthalene | 1-acetylamino-8-hydroxynaphthalene 3,6-disulfonic acid | reddish blue |
| 45 | 1-amino-3,6-bis-(β-sulfatoethylsulfonyl)-naphthalene | 2-hydroxynaphthalene-3,6-disulfonic acid | violet |
| 46 | 2-amino-8-(β-phosphatoethylsulfonyl)-naphthalene | 1-acetylamino-8-hydroxynaphthalene 3,6-disulfonic acid | reddish blue |
| 47 | 2-amino-8-(β-acetoxyethyl-sulfonyl)-naphthalene | " | reddish blue |
| 48 | 2-amino-8-(β-chloroethylsulfonyl)-naphthalene | " | reddish blue |
| 49 | 2-amino-8-(β-phosphatoethyl-sulfonyl)-naphthalene | 1-benzoylamino-8-hydroxynapthalene 3,6-disulfonic acid | reddish blue |
| 50 | 2-amino-8-(β-bromoethylsulfonyl)-naphthalene | 1-acetylamino-8-hydroxynaphthalene 3,6-disulfonic acid | reddish blue |
| 51 | 2-amino-8-(β-hydroxyethylsulfonyl)-naphthalene-6-sulfonic acid | 1-acetylamino-8-hydroxynaphthalene-3,6-disulfonic acid | reddish blue |

| Example No. | Diazo component | Coupling component | Shade of the copper complex |
|---|---|---|---|
| 52 | 2-amino-8-vinylsulfonyl-naphthalene-6-sulfonic acid | '' | reddish blue |
| 53 | 2-amino-7-(β-sulfatoethyl-sulfonyl)-naphthalene | '' | reddish blue |
| 54 | 2-amino-6-(β-sulfatoethyl-sulfonyl)-naphthalene | 2-acetylamino-8-hydroxy-naphthalene-6-sulfonic acid | violet |
| 55 | '' | 1-hydroxynaphthalene-4-sulfonic acid | violet |
| 56 | 2-amino-8-(β-sulfatoethyl-sulfonyl)-naphthalene-6-sulfonic acid | 1-acetoacetylamino-3-methyl-6-methoxybenzol-4-sulfonic acid | yellow brown |
| 57 | '' | barbituric acid | red brown |
| 58 | '' | 1-chloroacetylamino-8-hydroxy-naphthalene-3,6-disulfonic acid | navy blue |
| 59 | '' | 2-chloroacetylamino-8-hydroxy-naphthalene-6-sulfonic acid | violet |
| 60 | '' | 1-(3'-β-chloroethylsulfonyl)-benzoylamino-8-hydroxy-naphthalene-3,6-disulfonic acid | reddish blue |
| 61 | '' | 2-(N-phenylsulfonyl-N-methyl-amino)-8-hydroxynaphthalene 6-sulfonic acid | bluish red |
| 62 | '' | 1-chloro-8-hydroxynaphthalene 3,6-disulfonic acid | reddish blue |
| 63 | '' | 1-ethoxy-8-hydroxynaphthalene 3,6-disulfonic acid | reddish blue |
| 64 | '' | 1-(4'-β-sulfatoethylsulfonyl-phenyl)-3-methyl-5-pyrazolone | red |
| 65 | mixture of 2-amino-5-(β-sulfato-ethylsulfonyl)-naphthalene and 2-amino-8-(β-sulfatoethylsulfonyl)-naphthalene | 1-acetylamino-8-hydroxynaphtha-lene-3,6-disulfonic acid | reddish blue |
| 66 | mixture of 2-amino-6-(β-sulfato-ethylsulfonyl)-naphthalene and 2-amino-7-(β-sulfatoethylsulfonyl)-naphthalene | 1-acetylamino-8-hydroxy-naphthalene-3,6-disulfonic acid | reddish blue |
| 67 | 2-amino-8-(β-diethylaminoethyl-sulfonyl)-naphthalene-6-sulfonic acid | 1-acetylamino-8-hydroxynaphtha-lene-3,6-disulfonic acid | navy blue |
| 68 | '' | '' | navy blue |

EXAMPLE 69:

68.6 Parts (0.1 mole) of the dyestuff of the formula

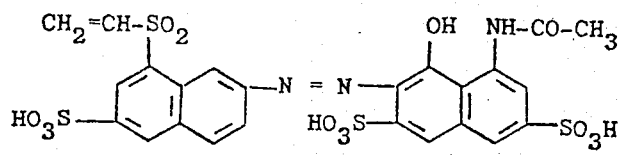

were dissolved in 1000 parts of water at 50°C. A solution of 27.5 parts of crystallized copper(II)-sulfate in 300 parts of water were added and for about one hour 68 parts of a 10% hydrogen peroxide were added at 50°C, the pH value of the solution being maintained at 4.8 – 5.2 by addition of about 40 parts of crystallized sodium acetate. When the oxidizing coppering was finished, the copper complex dyestuff formed was salted out with sodium chloride, filtered off and washed with sodium chloride solution.

The moist filter residue was introduced into 1000 parts of water. The whole was heated to 70° – 75°C, 37.5 parts of sodium thiosulfate containing crystal water were added; the pH was adjusted to 5.7 – 6.2 by portionwise addition of a 50% acetic acid and maintained at this value for 4 to 5 hours. Then the whole was cooled, the dyestuff was precipitated by addition of potassium chloride, filtered off and dried. 90 Parts of a salt-containing dyestuff were obtained, which in form of the potassium salt corresponds to the formula

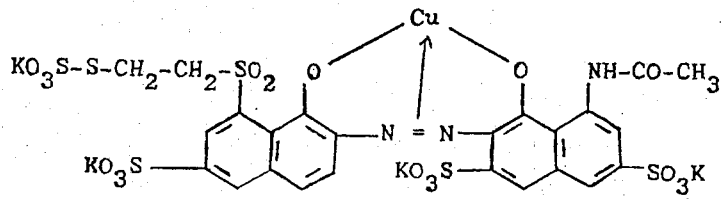

This dyestuff yielded intense red dyeings of good to very good fastness properties on cotton by using alkaline additives.

EXAMPLE 70:

70.3 Parts (0.1 mole) of the dyestuff of the formula

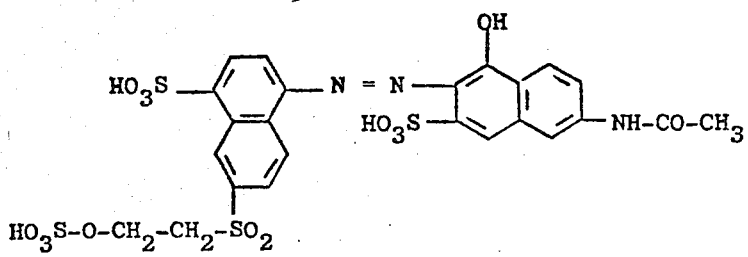

were dissolved at 60°C in 1000 parts of water. A solution of 27.5 parts of crystallized copper(II)-sulfate in 300 parts of water were added, and for one hour 102 parts of a 10% hydrogen peroxide were added at 60°C, the pH value of the solution being maintained at 4.8 – 5.2 by addition of about 45 parts of crystallized sodium acetate. When the oxidizing coppering was finished, the formed copper complex was precipitated by addition of potassium chloride and methanol and filtered.

The moist filter cake was dissolved in 800 parts of ice water, 140 parts of a 37% hydrochloric acid were added in such a way that the temperature did not exceed 5°C, and the whole was stirred for half an hour at 0° – 5°C. Then the o,o'-dihydroxyazo-dyestuff formed was precipitated by addition of 200 parts of potassium chloride, then filtered and washed with about 500 parts of a saturated potassium chloride solution.

The moist filter cake was dissolved in 500 parts of water. After addition of 20 parts of crystallized potassium-chromium-sulfate and 40 parts of crystallized sodium acetate, the solution was heated to the boil for 5 hours. After chroming the obtained solution was evaporated until dryness. The resulting chromium complex dyestuff corresponds in form of the potassium salt to the formula

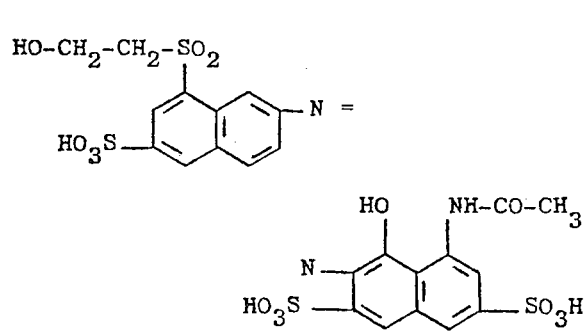

were dissolved in 1000 parts of water at 50°C. A solution of 27.5 parts of crystallized copper(II)-sulfate was obtained, and for one hour, 68 parts of a 10% hydrogen peroxide were added dropwise at 50°C, the pH value of the solution being maintained at 4.8 – 5.2 by progressive addition of about 40 parts of crystallized sodium acetate. When the oxidizing coppering was completed,

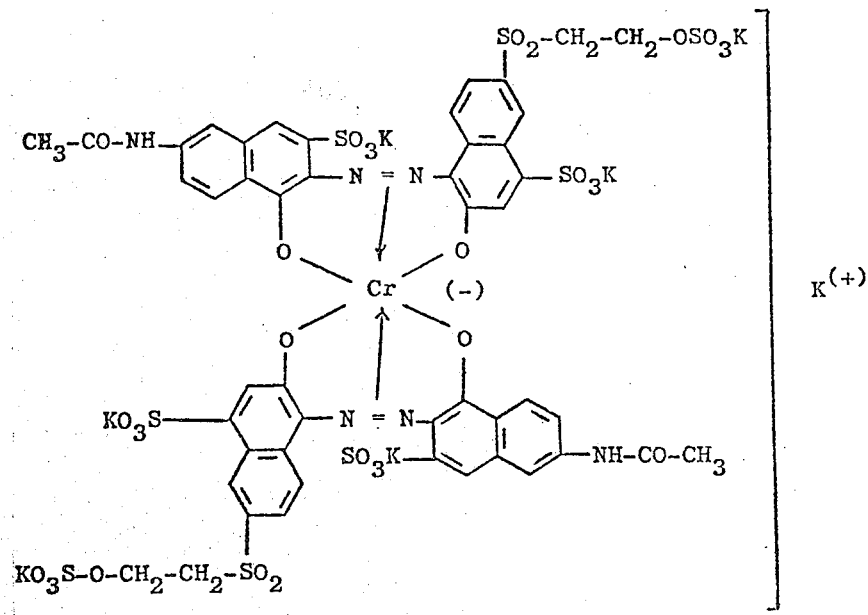

It yielded on cotton fabrics in the presence of alkaline agents dark blue dyeings of good fastness to light.

A dyestuff of similar properties but having a redder shade was obtained if in the preceding Example the potassium chromium sulfate was replaced by an equivalent amount of crystallized cobalt(II)-sulfate.

EXAMPLE 71:

70.3 Parts (0.1 mole) of the dyestuff of the formula the copper complex formed was salted out with sodium chloride, then filtered and dried.

The dried and ground dyestuff was slowly introduced at 0° to 10°C into 900 parts of concentrated sulfuric acid and stirred at 0° –10°C until a clear solution resulted. The obtained solution was stirred into a mixture of potassium chloride solution and ice unless the temperature exceeded 5°C. The precipitated o,o'-dihydroxy dyestuff of the formula

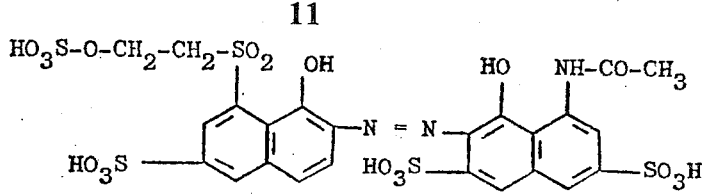

was filtered and washed free from mineral acid with a saturated potassium chloride solution.

The moist filter residue was dissolved in 600 parts of water. 25 Parts of crystallized sodium acetate and subsequently a solution of 28.5 parts of crystallized nickel sulfate in 100 parts of water were added to the solution. The mixture was stirred at 60°C, until the formation of the nickel complex was completed. The nickel complex dyestuff which in form of the free acid corresponds to the formula

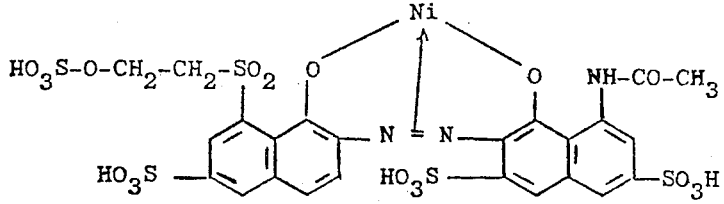

was salted out by addition of potassium chloride, filtered off and dried. 90 Parts of a salt-containing dyestuff were obtained which yielded on cotton fabric in the presence of alkaline agents violet dyeings of good fastness to washing and to light.

We claim:

1. A water-soluble copper complex compound of a monoazo dyestuff which in the metal-free form and in form of the free acid corresponds to the formula

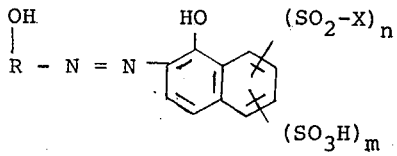

wherein

X is vinyl or $-CH_2-CH_2-Z$ in which Z is chlorine, bromine, methylsulfonyloxy, p-toluenesulfonyloxy, acetoxy, 3-sulfobenzoyloxy, phenoxy, dimethylamino, diethylamino, thiosulfato, phosphato or sulfato, $m$ is 0 or 1, $n$ is 1 or 2, the sum of $(m + n)$ is 1 or 2, and in which HO—R is naphthol or naphthol substituted by chloro, methyl, methoxy, ethoxy, amino, acetylamino, benzoylamino, chloroacetylamino, 3-($\beta$-chloroethylsulfonyl)-benzoylamino, N-phenylsulfonyl-N-methyl-amino, hydroxy, sulfo or $-SO_2-X$ wherein X is defined as above.

* * * * *